(12) United States Patent
Du et al.

(10) Patent No.: US 11,885,777 B2
(45) Date of Patent: Jan. 30, 2024

(54) METHOD FOR PURIFYING AND DETECTING 6-HYDROXYNOBILONINE IN FRESH STEMS OF DENDROBIUM HUOSHANENSE

(71) Applicant: Anhui Agricultural University, Hefei (CN)

(72) Inventors: Xianfeng Du, Hefei (CN); Yuchen Gao, Hefei (CN); Li Lin, Hefei (CN); Yaoyao Xia, Hefei (CN)

(73) Assignee: Anhui Agricultural University, Hefei (CN)

( * ) Notice: Subject to any disclaimer, the term of this patent is extended or adjusted under 35 U.S.C. 154(b) by 0 days.

(21) Appl. No.: 18/338,495

(22) Filed: Jun. 21, 2023

(65) Prior Publication Data

US 2023/0408462 A1 Dec. 21, 2023

(30) Foreign Application Priority Data

Jun. 21, 2022 (CN) .......................... 202210706723.8

(51) Int. Cl.
*G01N 30/72* (2006.01)
*G01N 1/34* (2006.01)
*G01N 30/06* (2006.01)
*G01N 30/02* (2006.01)

(52) U.S. Cl.
CPC .......... *G01N 30/7206* (2013.01); *G01N 1/34* (2013.01); *G01N 30/06* (2013.01);
(Continued)

(58) Field of Classification Search
CPC ...... G01N 30/7206; G01N 1/34; G01N 30/06; G01N 2030/025; G01N 2030/067; G01N 2333/988
See application file for complete search history.

(56) References Cited

FOREIGN PATENT DOCUMENTS

| CN | 106501437 A | 3/2017 |
| CN | 106511236 A | 3/2017 |

(Continued)

OTHER PUBLICATIONS

Foldesi, Balint. "Guide to Enzyme Unit Definitions and Assay Design," Biomol. Nov. 3, 2019. Accessed Online. <https://www.biomol.com/resources/biomol-blog/guide-to-enzyme-unit-definitions-and-assay-design>. (Year: 2019).*

(Continued)

*Primary Examiner* — Jill A Warden
*Assistant Examiner* — Michael Paul Shimek
(74) *Attorney, Agent, or Firm* — Westbridge IP LLC

(57) ABSTRACT

A method for efficiently purifying and detecting 6-hydroxynobilonine in fresh stems of *Dendrobium huoshanense* uses a gas chromatography-mass spectrometry (GC-MS) method to detect 6-hydroxynobilonine in *Dendrobium huoshanense* is, i.e., a to-be-detected solution of 6-hydroxynobilonine is extracted from fresh stems of *Dendrobium huoshanense*, the extraction method is as follows: freeze-drying, smashing and screening fresh stems of *Dendrobium huoshanense* to obtain dendrobium dry powder, adding water for performing ultrasonic treatment, and then adding a composite enzyme for enzymolysis to obtain an enzymolysis solution; adding acidity alcohol into the enzymolysis solution, extracting for 1 min under an ultra-high pressure, and then taking filtrate; and concentrating the filtrate in vacuum, then purifying using a mixed-mode cation exchanger (MCX) extraction column, eluting with a methanol-acetonitrile solution, collecting eluent, blowing with nitrogen until no water, and then dissolving with methanol and filtering to obtain the to-be-detected solution.

4 Claims, 3 Drawing Sheets

(52) U.S. Cl.
CPC . *G01N 2030/025* (2013.01); *G01N 2030/067* (2013.01); *G01N 2333/988* (2013.01)

(56) References Cited

FOREIGN PATENT DOCUMENTS

| CN | 109283269 A | 1/2019 |
| CN | 111658730 A | 9/2020 |
| CN | 113952419 A | 1/2022 |

OTHER PUBLICATIONS

Wang, Yan-Hong, et al. "Tandem mass spectrometry for structural identification of sesquiterpene alkaloids from the stems of Dendrobium nobile using LC-QToF." Planta Medica 82.07 (2016): 662-670. (Year: 2016).*

Chen, Study on purification and neuroprotective effect of alkaloids from Dendrobium, Dissertation submitted for the Degree of Master of Hefei University of Technology, dated Jan. 15, 2020.

Cui, Study on extraction, Purification of alkaloids and the process of vacuum freeze drying of Dendrobium huoshanense, Dissertation submitted for the Degree of Master of Anhui Agricultural University, dated May 15, 2014.

First Office Action issued in counterpart Chinese Patent Application No. 202210706723.8, dated Jan. 28, 2023.

Xin et al., The Utilization and Suggestions of Improvement Path on Dendrobium Germplasm, Heilongjiang Agricultural Sciences, vol. 2008, No. 2, pp. 141-144, dated Mar. 31, 2008.

* cited by examiner

METHOD FOR PURIFYING AND DETECTING 6-HYDROXYNOBILONINE IN FRESH STEMS OF DENDROBIUM HUOSHANENSE

CROSS-REFERENCE TO RELATED APPLICATIONS

The application claims priority to Chinese Patent Application No. 202210706723.8 filed on Jun. 21, 2022, which is incorporated herein by reference in its entirety.

TECHNICAL FIELD

The present disclosure belongs to the technical field of detection, and particularly relates to a method for efficiently purifying and detecting 6-hydroxynobilonine in fresh stems of *Dendrobium huoshanense*.

BACKGROUND

Alkaloids in *dendrobium* have the effects of clearing heat and nourishing the stomach, improving eyesight and sound, reducing fever and relieving pain, and can also be used for lowering blood pressure and heart rate, slowing breathing, and relieving barbitalism.

Most of the alkaloids are present in plant cells in a form of salts, and a few of alkaloids with extremely weak alkalinity are present in a free state. At present, studies on alkaloid extraction show that free alkaloids are soluble in lipophilic organic solvents or alcohol solvents, but insoluble in water, while saline alkaloids are more easily soluble in water. According to different extraction solvents, the alkaloid extraction methods can be classified as a lipophilic organic solvent extraction method, an alcohol extraction method and an acid water extraction method. With regard to studies on extraction of *dendrobium* alkaloids, the lipophilic organic solvent extraction method and the ethanol extraction method are mainly used.

The lipophilic organic solvent extraction method mainly uses trichlormethane as an extraction solvent, but has the disadvantage of large toxicity; the alcohol extraction method mainly uses methanol or ethanol as an extraction solvent, but the *dendrobium* extraction solution obtained by the ethanol extraction method often contains many fat-soluble impurities; if ethanol-water is used as an extraction solvent, the *dendrobium* extraction solution also contains some water-soluble impurities such as polysaccharide, which are not beneficial to purification.

In addition, specific alkaloids in *dendrobium* alkaloids are difficult to separate, and about 41 alkaloids have been currently found in *dendrobium* plants. According to structural framework, there are mainly five alkaloids with different structural frameworks, which are respectively sesquiterpene, indolizidines, pyrrolidines, phthalides and imidazoles, and the separation of *dendrobium* alkaloids between similar species is more susceptible to impact.

The content and component types of total alkaloids *Dendrobium huoshanense* (*D. huoshanense*), which is limited to Huoshan, Anhui, is known as the "top of the nine immortal grasses in China". In recent years, *Dendrobium huoshanense* alkaloid is also confirmed to have an antibacterial effect, and may have an anticancer effect. The 6-hydroxynobilonine therein is a kind of nitrogen-containing small molecule organic compounds with complex cyclic structures. But, at present, there are a few of researches on 6-hydroxydendrobicine due to its low content and difficulty in extraction. In addition, the alkaloids in *dendrobium* are affected by factors such as drying, storage, and extraction processes, resulting in varying degrees of loss. The natural content of 6-hydroxydendrobine is already low, and is greatly affected by the extraction process. Currently, most alkaloid extraction methods cannot even detect 6-hydroxydendrobine. At present, the successful and efficient extraction of this substance as well as the analysis and confirmation of rapid preparation are a major obstacle to the research of 6-hydroxynobilonine.

SUMMARY

In order to solve the above problem, the present disclosure provides a method for efficiently purifying and detecting 6-hydroxynobilonine in fresh stems of *dendrobium huoshanense*.

The present disclosure adopts the following technical solution:

provided is a method for efficiently purifying and detecting 6-hydroxynobilonine in fresh stems of *Dendrobium huoshanense*, where the 6-hydroxynobilonine is detected by using a gas chromatography-mass spectrometry (GC-MS) method, and a to-be-detected solution of 6-hydroxynobilonine is extracted from fresh stems of *Dendrobium huoshanense* for detection, and the extraction method comprises the following steps:

S1, dehydrating fresh stems of *Dendrobium huoshanense* through a freeze-drying method, smashing and screening to obtain *dendrobium* dry powder for later use;

S2, adding water into the *dendrobium* dry powder in S1, performing ultrasonic treatment for 20-30 min, then adding a composite enzyme accounting for 1.5% of the mass of the *dendrobium* dry powder for 1.5 h of enzymolysis to obtain an enzymolysis solution, where a use ratio of the *dendrobium* dry powder to water is 1 g: 6 mL;

S3, adding a set amount of acidity alcohol into the enzymolysis solution, placing for 18-24 h at room temperature, then treating for 1 min in vacuum and under an ultrahigh pressure of 100 MPa, filtering residue and taking filtrate;

S4, concentrating the filtrate to 5-8 mL in vacuum, then purifying using a mixed-mode cation exchange (MCX) extraction column, eluting with a methanol-acetonitrile solution, collecting eluent, blowing with nitrogen until no water, and then dissolving with a methanol solution and filtering to obtain the to-be-detected solution containing 6-hydroxynobilonine.

Preferably, in the step S1, the freeze-drying temperature is −50° C., the freeze-drying time is 40-48 h, and the smashing fitness is 80 meshes.

Preferably, in the step S2, the composite enzyme is vibrantly prepared from a fiber enzyme and pectinase in 10000 U/g.

Preferably, in the step S3, the acidity alcohol is added in a volume ratio of enzymolysis solution to acidity alcohol being 1:40, and the acidity alcohol is an ethanol aqueous solution having a volume concentration of 70% and a pH value of 3-3.5.

Preferably, in the step S4, the specific purification operation of the MCX extraction column is as follows:

the filtrate after concentration is dissolved with a $H_3PO_4$ aqueous solution having a mass concentration of 2-5% and passes through a 0.22 μm water filter membrane to obtain an injection solution; the MCX extraction column is activated by using 5-8 ml of methanol and 5-8 ml of water in sequence, the injection solution is injected at a flow rate of 0.5-1.0 ml/min, after injection, the column is leached using 3-5 mL of formic acid aqueous solution having a mass concentration of 2-5%; and after leaching, the column is eluted with a methanol/acetonitrile solution containing ammonium hydroxide accounting for 3-5% of volume ratio of the solution to obtain eluent.

Preferably, the GC-MS detection includes gas chromatography and mass spectrometry, where the specific operation of the gas chromatography is as follows: the specific condition of gas chromatography is as follows: an initial column temperature is 70° C. and raised to 150° C. at 2° C./min, and then maintained for 1 min, then the temperature is raised to 180° C. at 3° C./min then maintained for 1 min, then the temperature is raised to 240° C. at 20° C./min and then maintained for 3 min; during the period, a carrier gas is high-purity He and injected at a flow rate of 1.0 ml/min; a split ratio is set as 20:1;

the specific operation of the mass spectrometry is as follows: an electron impact (EI) ion source; ion energy is set as 70 eV; a temperature is set as 200° C.; a scanning range m/z of full-scanning determination is 40-500.

Compared with the prior art, the present disclosure has the beneficial effects:

The content of total alkaloids varies greatly among different species and *dendrobium*, which accounts for only 0.043% in *Dendrobium huoshanense*, while reaches 0.548% (dry weight) in other varieties, such as *dendrobium nobile*. There are many types of alkaloids in *dendrobium huoshanense*, and the alkaloids are significantly difficult to extract and separate.

6-hydroxynobiline is a kind of nitrogen containing heterocyclic compound, which belongs to sesquiterpene alkaloids, also known as a *dendrobium* type alkaloid. Its structure is characterized in that a nitrogen-containing pyrrole ring and a sesquiterpene part constitute a tight four-ring system. The content of 6-hydroxynobiline in *dendrobium* is especially low compared with other alkaloids. Its chemical structure formula is as follows:

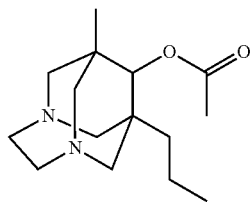 [SMILES: CCCC12CN3CCN(CC(C)(C3)C1OC(C)=O)C2]

At present, *dendrobium* mostly is dried by using a traditional drying technology, which leads to serious loss of active ingredients, thereby affecting the quality and efficacy of medicinal materials. Vacuum freeze drying is a drying technology developed rapidly in modern times, which can better ensure the appearance and color of medicinal materials, maximize the preservation of the activity of active ingredients of medicinal materials, dry thoroughly, and be easy to preserve. In the present disclosure, the fresh stems of *dendrobium* are placed in a freeze-drying machine for dehydration and drying. Compared to traditional drying techniques, use of the technology of the present disclosure can greatly reduce the loss of active ingredients in *dendrobium* and avoid reduction in the decomposition of alkaloids due to excessive temperature.

Ultrasound has the characteristics of strong cell disruption, high extraction efficiency and low time cost. The cellulase and pectinase used are widely available and inexpensive, and mild reaction conditions are mild and easy to operate. By combining ultrasound with enzymes, the alkaloids in *Dendrobium huoshanense* can be dissolved out to a greater extent. After being extracted with acidity alcohol for 18-24 hours under ultra-high pressure, the alkaloids can be fully extracted, thereby increasing the extraction rate.

6-hydroxynobilonine is a class of pure alkaline nitrogen-containing heterocyclic organic small molecule compounds. MCX is a high molecular polymer, which is a cation exchange adsorbent that can directly adsorb alkaline chemicals. Therefore, MCX purification in the present application is a simple and effective separation method.

The present disclosure uses *Dendrobium huoshanense* as a raw material, with fewer steps for preparing the extraction solution and high extraction and purification efficiency. Based on ultrasonic/ultra-high pressure extraction, combined with enzyme extraction, freeze-drying and other technologies, it provides an efficient and complete method for extraction, purification and identification of characteristic alkaloid 6-hydroxydendrobine in *Dendrobium huoshanense*, which is of great significance for extraction of 6-hydroxydendrobine. The present disclosure provides scientific basis for effective utilization and resource development of *Dendrobium huoshanense*, as well as technical support for the exploration and identification of 6-hydroxynobilonine in other types of *dendrobium*, and also provides new ideas for the extraction and purification of alkaloids from other active substances and other plants.

DETAILED DESCRIPTION OF THE EMBODIMENTS

Next, the technical solution will be illustrated more specifically in combination with examples. Unless otherwise stated, the terms used herein are all meaning conventionally understood by those skilled in the art.

Example 1

6-hydroxydendrobicine is extracted and identified by using the method of the present disclosure, which comprises the following steps:

S1, fresh stems of *Dendrobium huoshanense* was dehydrated through a freeze-drying method, smashed and screened via a 80-mesh sieve to obtain *dendrobium* dry powder, where the freeze-drying temperature was −50° C., and the freeze-drying time was 40-48 h;

S2, about 30 mL of water was added into 5 g of *dendrobium* dry powder, and then the mixture was subjected to ultrasonic treatment under ultrasonic power of 100 W for 20-30 min, then 0.075 g of composite enzyme (a fiber enzyme and pectinase were prepared in 10000 U/g) was added for 1.5 h of enzymolysis to obtain an enzymolysis solution;

S3, a set amount of acidity alcohol was added into the enzymolysis solution in a volume ratio of enzymolysis solution to acidity alcohol being 1:40, and the mixed solution was placed for 18 h at room temperature, then treated for 1 min in vacuum and under an ultrahigh pressure of 100 MPa, residue was filtered and filtrate was taken, where the acidity alcohol was an ethanol aqueous solution having a volume concentration of 70% and a pH value of 3-3.5.

S4, the filtrate was concentrated to 5 mL in vacuum, then purified using an MCX extraction column, eluted with a methanol-acetonitrile solution, and then eluent was collected. The specific purification operation was as follows:

the filtrate after concentration was dissolved with a $H_3PO_4$ aqueous solution having a mass concentration of 2-5%, and a sample was sufficiently dissolved by vortexing for 2-3 min and then passed through a 0.22 μm water filter membrane prior to injection to obtain an injection solution;

the MCX extraction column was activated, i.e., a solid extraction column was activated by using 5-8 ml of methanol and then balanced with 5-8 ml of water, after the column was balanced, the injection solution was injected at a flow rate of 0.5-1.0 ml/min, after injection, the column was leached using 3-5 mL of formic acid aqueous solution having a mass concentration of 2-5%, subsequently the solid extraction column was placed in a vacuum pump to drain the solution remaining in the column, after leaching, the column was eluted with a methanol/acetonitrile (a volume ratio of 1:1) solution containing ammonium hydroxide with a volume ratio of 3-5% to obtain eluent.

The eluent was dried with nitrogen on a nitrogen blowing instrument to obtain a purified to-be-detected sample containing 6-hydroxynobilonine.

The to-be-detected sample was dissolved with methanol and filtered to obtain a to-be-detected solution containing 6-hydroxynobilonine, and the sample was detected using the GC-MS method including gas chromatography detection and mass spectrometric detection.

Figure 2:
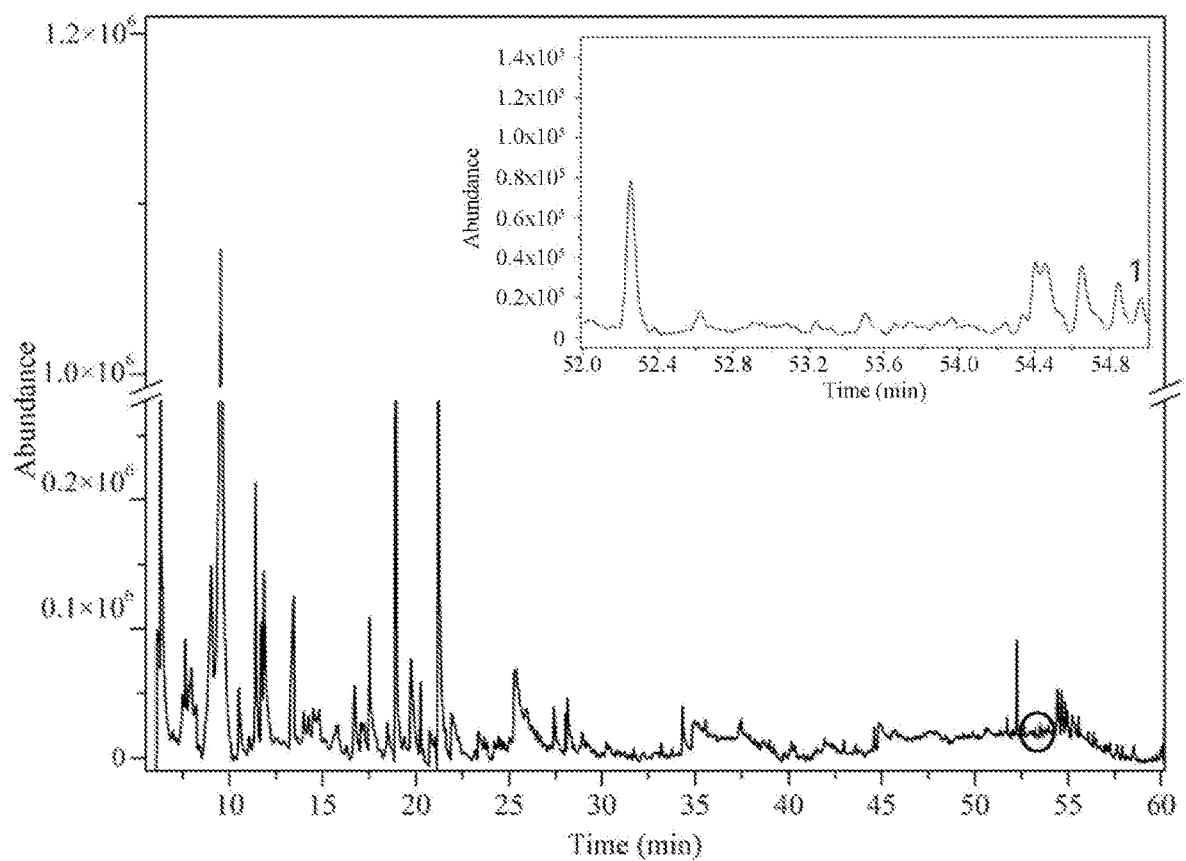
FIG. 2 is a GC-MS detection result of a sample prepared in example 1, and an enlarged view of the circle in the upper right corner of the image, and is a characteristic peak of 6-hydroxynobilonine, indicating detection.

The specific operation of the gas chromatography was as follows: the chromatography column was an Agilent DB-5MS (30 m×0.25 μm×0.25 mm); a carrier gas was high-purity He and injected at a flow rate of 1.0 ml/min. The column temperature: an initial temperature was 70° C. and raised to 150° C. at 2° C./min, and then maintained for 1 min, and then the temperature was raised to 180° C. at 3° C./min and then maintained for 1 min; the temperature was raised to 240° C. at 20° C./min and then maintained for 3 min. The split ratio was set as 20:1, and the total injection volume of the to-be-detected solution was 10 μL. The specific operation of the mass spectrometry was as follows: an EI ion source; ion energy was set as 70 eV; a temperature was set as 200° C.; a scanning range m/z of full-scanning determination was 40-500. Detection results are shown in FIG. 2.

Comparative Example 1

The *dendrobium* dry powder in example 1 was used as a test material. Refer to the method provided in the previous research of our research group "Cui Nannan. Research on the extraction and purification of alkaloids and vacuum freeze drying process of *Dendrobium huoshanense* [D]. Anhui Agricultural University, 2013.". 0.1% cellulose was added into 1 g of *dendrobium* dry powder, and then the above mixture was subjected to enzymolysis for 2 h, extracted at 40° C. and purified in an AB-8 macroporous resin to obtain alkaloid in *Dendrobium huoshanense*.

Figure 3:
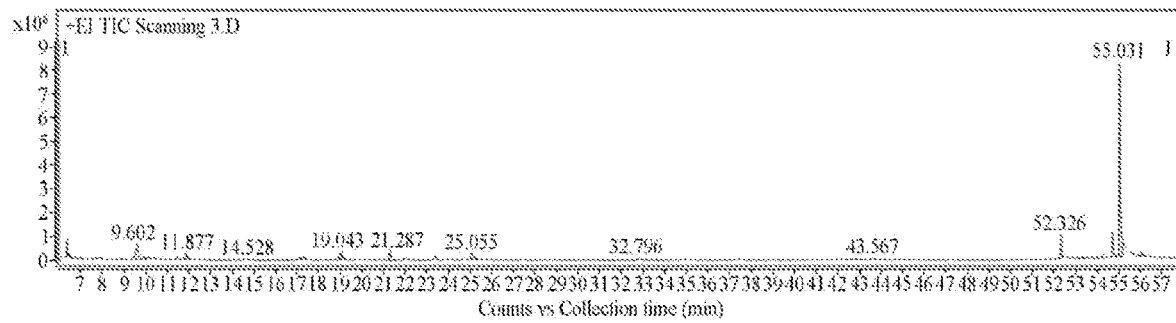
FIG. 3 is a GC-MS detection result of a sample prepared in example 1, without 6-hydroxynobilonine detection.

Through GC-MS detection, a chromatography column was an Agilent DB-5MS (30 m×0.25 μm×0.25 mm); a carrier gas was high-purity He and a flow rate was 1.0 ml/min; a column temperature: an initial temperature was 60° C. and raised to 150° C. at 3° C./min, and then maintained for 1 min; then the temperature was raised to 200° C. at 3° C./min and then maintained for 1 min; the temperature was raised to 280° C. at 20° C./min and then maintained for 3 min. Injection mode: split injection, a split ratio was set as 30:1, and a total injection volume was 10 μL. The detection results are shown in FIG. 3.

Comparative Example 2

The *dendrobium* dry powder in example 1 was used as a test material. Acidity alcohol was added into 1 g of *Dendrobium huoshanense*. The above mixture was treated for 20 min under the ultrasonic power of 100 w to extract alkaloid in *Dendrobium huoshanense*.

Figure 4:
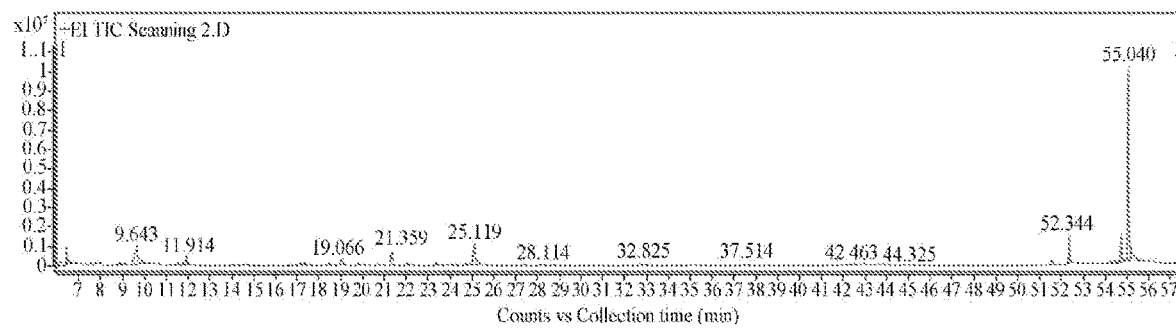
FIG. 4 is a GC-MS detection result of a sample prepared in example 2, without 6-hydroxynobilonine detection.

Through GC-MS detection, chromatography conditions: a DB-5 capillary column (0.25 μm×0.25 mm×30 m), a carrier gas was high-purity He, the temperature of an injection inlet was 250° C., the temperature of a detector was 250° C., an injection volume was 10 μL, a split ratio was 1:10, and a temperature program was as follows: an initial temperature was 80° C. and raised to 250° C. at 10° C./min, and then maintained for 13 min. The detection results are shown in FIG. 4.

Comparative Example 3

The *dendrobium* dry powder in example 1 was used as a test material. Refer to an extraction method provided in "Chen Jingchao. Isolation, purification and neuroprotective effects of alkaloids in *Dendrobium* [D]. Hefei University of Technology, 2019", 800 g of fresh *Dendrobium huoshanense* strips were taken and cut into sections, frozen for 24 h in a refrigerator at 80° C., then freeze-dried for 24 h in vacuum, smashed using a traditional Chinese medicine machine and screened via 100-mesh sieve to obtain the *dendrobium* dry powder. An extraction solvent acidity ethanol (70% EtOH, pH=3) was added in a material-to-liquid ratio of 1:25, leached three times in water bath at 80° C., each for 2 h, filtrates were merged to obtain an ethanol extract, the ethanol extract was concentrated at reduced pressure, then a 2% HCl aqueous solution was added for dissolution, the dissolved solution was extracted once with an equal volume of dichloromethane, then a dichloromethane phase was extracted twice using an equal volume of 2% HCl aqueous solution, 2% HCl aqueous solution layers were merged to obtain an acidic phase, the acidic phase was adjusted with ammonium hydroxide until pH was 10.0, an equal volume of trichloromethane was used to extract five times, and then trichloromethane phases were merged. The merged trichloromethane phase was concentrated at reduced pressure to obtain a sample, and the sample was purified through solid phase extraction (SPE) to obtain a final sample. The final sample was detected through GC-MS.

Figure 5:
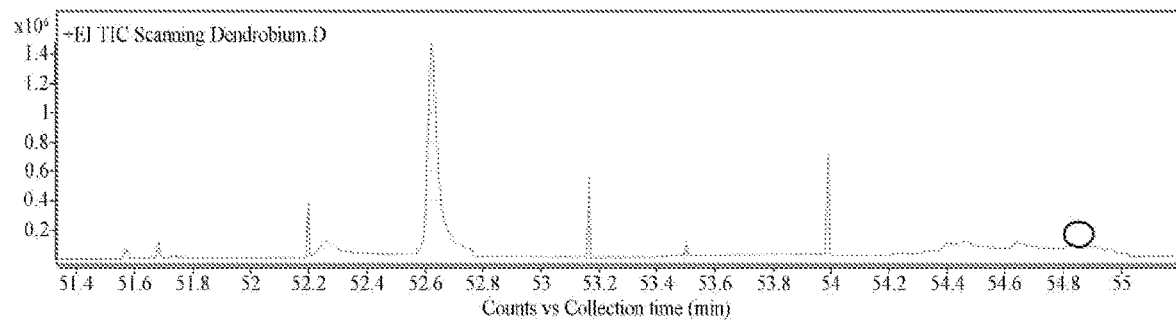
FIG. 5 is a GC-MS detection result of a sample prepared in example 3, the position circled in the figure at 54.841 min is 6-hydroxydendrobicine.

Through GC-MS detection, gas chromatography conditions: a chromatography column was Agilent DB-5MS (30 m×0.25 μm×0.25 mm); a carrier gas was high-purity He and injected at a flow rate of 1.0 mL/min; a column temperature:

an initial temperature was set as 70° C. and raised to 150° C. at 2° C./min, and then maintained for 1 min; the temperature was raised to 180° C. at 3° C./min, and then maintained for 1 min; and then the temperature was raised to 240° C. at 20° C./min, and then maintained for 3 min. A split ratio was set as 20:1, and an injection volume was 10 μL. The mass spectrometry conditions: an EI ion source; ion energy was set as 70 eV; a temperature was set as 200° C.; a scanning range m/z of full-scanning determination was 40-500. The detection results are shown in FIG. 5.

Experimental Results

Figure 1:
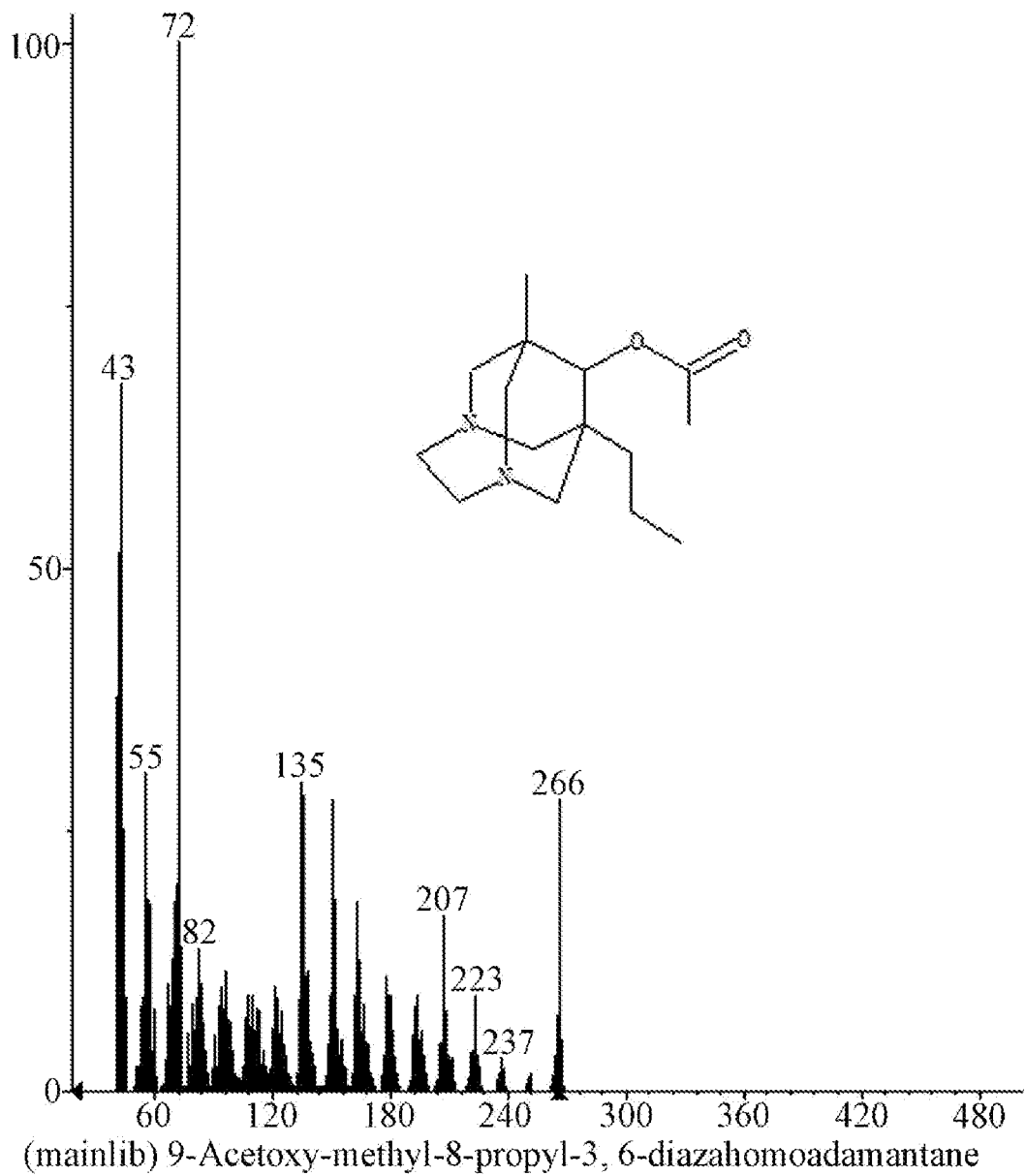
FIG. 1 is a standard mass spectrogram of 6-hydroxynobilonine in main spectrum library.

The detection results in example 1 and comparative examples 1-3 are seen in Table 1, where 6-hydroxynobilonine was detected by referring to standard mass spectrometry shown in FIG. 1.

TABLE 1

Result comparison of 6-hydroxynobilonine

| Group | Totalalkaloid μg/mL | 6-hydroxynobilonine (Account for total alkaloid) |
|---|---|---|
| Example 1 | 55.96 | Relative content: 11.25% |
| Comparatiwe exarple 1 | 35.65 | Undetected |
| Comparatiwe exarple 2 | 37.43 | Undetected |
| Comparatiwe exarple 3 | 41.78 | Relative content: 6.34% |

The above comparative examples respectively refer to several publicly available methods for extracting alkaloids from *Dendrobium huoshanense*, and utilize GC-MS for detection, with high GC-MS sensitivity and small sample amount, can detect ng/g level substances, and are beneficial for obtaining only trace samples.

It can be seen from GC-MS detection results that the alkaloids in *Dendrobium huoshanense* is extracted by using the method provided by the present disclosure, the total alkaloid extraction amount is relatively high, and 6-hydroxynobilonine accounts for a high proportion of total alkaloids, with minimal loss and can be clearly detected, far higher than other existing detection methods.

The above embodiments are only used to illustrate the technical solution of the present disclosure, and are not limited to the present disclosure; although the present disclosure has been described in detail with reference to the aforementioned embodiments, ordinary technical personnel in this field should understand that any modifications, equivalent substitutions and improvements made within the spirit and principles of the present disclosure should be included in the scope of protection of the present disclosure.

What is claimed is:

1. A method for purifying and detecting 6-hydroxynobilonine in fresh stems of *Dendrobium huoshanense*, wherein the 6-hydroxynobilonine is detected by using a gas chromatography-mass spectrometry (GC-MS) method, a to-be-detected solution of 6-hydroxynobilonine is extracted from fresh stems of *Dendrobium huoshanense* for detection, and the extraction method is as follows:
    S1, dehydrating fresh stems of *Dendrobium huoshanense* through a freeze-drying method, smashing and screening to obtain *dendrobium* dry powder;
    S2, adding water into the *dendrobium* dry powder from S1 in a ratio of 1g of *dendrobium* dry powder to 6 mL of water, performing ultrasonic treatment for 20-30 min, then performing enzymolysis for 1.5 h by adding an amount of a composite enzyme equal to 1.5% the mass of the *dendrobium* dry powder to obtain an enzymolysis solution wherein the composite enzyme comprises a fiber enzyme and pectinase and the composite enzyme is prepared from a fiber enzyme and pectinase in 10000 U/g;
    S3, adding a set amount of acidity alcohol into the enzymolysis solution, leaving the enzymolysis solution for 18-24 h at room temperature, then vacuuming the enzymolysis solution for 1 min under an ultrahigh pressure of 100 MPa, then filtering the residue and removing the filtrate, wherein the acidity alcohol is an aqueous solution comprising 70% ethanol by volume and having a pH value of 3-3.5; and
    S4, concentrating the filtrate in vacuum to 5-8 mL, then purifying the filtered concentrate using a mixed-mode cation exchanger (MCX) extraction column, eluting with a methanol-acetonitrile solution, collecting eluent, blowing the eluent with nitrogen to remove the water until no water, and then dissolving with a methanol solution and filtering to obtain the to-be-detected solution containing 6-hydroxynobilonine; wherein
    the GC-MS detection includes gas chromatography and mass spectrometry, wherein the specific operation of the gas chromatography in the GC-MS method is as follows: a chromatography column is 30 m×0.25 μm×0.25 mm, an initial column temperature is 70° C. and raised to 150° C. at 2° C./min, and then maintained for 1 min, then the temperature is raised to 180° C. at 3° C./min and then maintained for 1 min, then the temperature is raised to 240° C. at 20° C./min and then maintained for 3 min; during the gas chromatography operation, a carrier gas is high-purity He and injected at a flow rate of 1.0 ml/min; a split ratio is set as 20:1; and
    the specific operation of the mass spectrometry in the GC-MS method is as follows: an electron impact (EI) ion source; ion energy is set as 70 eV; a temperature is set as 200° C.; a scanning range m/z of a full-scanning range of 40-500 m/z.

2. The method for purifying and detecting 6-hydroxynobilonine in fresh stems of *Dendrobium huoshanense* according to claim 1, wherein in the step S1, the freeze-drying temperature is −50° C., the freeze-drying time is 40-48 h, and the screening of S1 comprises screening the smashed *Dendrobium huoshanense* through an 80-mesh sieve to obtain the *dendrobium* dry powder.

3. The method for purifying and detecting 6-hydroxynobilonine in fresh stems of *Dendrobium huoshanense* according to claim 1, wherein in the step S3, the set amount of acidity alcohol added is a volume ratio of enzymolysis solution to acidity alcohol of 1:40.

4. The method for purifying and detecting 6-hydroxynobilonine in fresh stems of *Dendrobium huoshanense* according to claim 1, wherein in the step S4, the specific operation of the MCX extraction column is as follows:
    the filtrate, after concentration, is dissolved with an aqueous solution comprising 2-5% $H_3PO_4$ by mass and then passed through a 0.22 μm water filter membrane to obtain an injection solution; activating the MCX extraction column with 5-8 ml of methanol and 5-8 ml of water in sequence; injecting the injection solution at a flow rate of 0.5-1.0 ml/min; leaching the column with 3-5 mL of an aqueous solution comprising 2-5% formic acid by mass; and after leaching, the column is eluted with a methanol/acetonitrile solution containing 3-5% of ammonium hydroxide by volume to obtain eluent.

* * * * *